(12) United States Patent
Liu et al.

(10) Patent No.: US 7,487,945 B2
(45) Date of Patent: Feb. 10, 2009

(54) SIZE ADJUSTABLE CUP HOLDER IN A MOTOR VEHICLE

(75) Inventors: Frank Q. Liu, Canton, MI (US); Mark M. Sheldon, Shelby Township, MI (US)

(73) Assignee: Visteon Technologies, Inc., Van Buren Township, MI (US)

( * ) Notice: Subject to any disclaimer, the term of this patent is extended or adjusted under 35 U.S.C. 154(b) by 67 days.

(21) Appl. No.: 11/062,066

(22) Filed: Feb. 18, 2005

(65) Prior Publication Data
US 2006/0186283 A1    Aug. 24, 2006

(51) Int. Cl.
*A47K 1/08*    (2006.01)
(52) U.S. Cl. ................... 248/311.2 A; 224/926
(58) Field of Classification Search ........... 248/311.2
See application file for complete search history.

(56) References Cited

U.S. PATENT DOCUMENTS

| 2,406,334 | A |  | 8/1946 | Keller et al. |
| 4,711,452 | A | * | 12/1987 | Dickinson et al. ....... 273/143 R |
| 5,054,733 | A |  | 10/1991 | Shields |
| 5,167,392 | A |  | 12/1992 | Henricksen |
| 5,398,898 | A |  | 3/1995 | Bever |
| 5,782,448 | A |  | 7/1998 | Withun et al. |
| 5,839,711 | A |  | 11/1998 | Bieck et al. |
| 5,921,519 | A | * | 7/1999 | Dexter et al. ............. 248/311.2 |
| 6,070,844 | A |  | 6/2000 | Salenbauch et al. |
| 6,230,948 | B1 | * | 5/2001 | Steiger et al. ............... 224/539 |
| 6,702,241 | B2 | * | 3/2004 | Harada ..................... 248/311.2 |
| 6,705,580 | B1 | * | 3/2004 | Bain ........................ 248/311.2 |
| 6,758,452 | B1 |  | 7/2004 | Salenbauch et al. |
| 6,843,397 | B2 | * | 1/2005 | Then et al. .................. 224/552 |
| 7,334,294 | B2 | * | 2/2008 | Liu et al. ........................ 16/307 |
| 2003/0106976 | A1 |  | 6/2003 | Then et al. |
| 2004/0021048 | A1 |  | 2/2004 | Schaal |
| 2004/0118860 | A1 |  | 6/2004 | Leopold et al. |
| 2005/0184209 | A1 | * | 8/2005 | Dobos ..................... 248/311.2 |
| 2005/0274862 | A1 | * | 12/2005 | Takeichi .................. 248/311.2 |

* cited by examiner

*Primary Examiner*—Amy J. Sterling
(74) *Attorney, Agent, or Firm*—Brinks Hofer Gilson & Lione

(57) ABSTRACT

The present invention discloses a cup holder in which a body includes a base and a cylindrical sidewall having an opening through which a protrusion is pivotably mounted for movement between a fully extended position and a fully retracted position. A continuous elastic member biases the protrusion to the fully extended position.

10 Claims, 2 Drawing Sheets

SIZE ADJUSTABLE CUP HOLDER IN A MOTOR VEHICLE

BACKGROUND

1. Field of Invention

The invention relates generally to a cup holder for an automobile. More specifically, the invention relates to a size adjustable cup holder for an automobile.

2. Related Technology

Most automobiles have one or more cup holders placed in the passenger compartment of the automobile. However, some of these cup holders cannot adjust to the size of the beverage container. This can be problematic in a situation where the automobile is accelerating, braking or turning because the beverage container may tip over, even when located in the cup holder during such situations.

One solution is to place "claws", also called a protrusion, within the cup holder. These claws pivot in a direction parallel to the base of the cup holder (the base being the bottom of the beverage container rests). These claws are biased through the use of springs towards the beverage container, thereby frictionally engaging the side walls of the beverage container and holding the beverage container in place when the automobile is accelerating, braking or turning. The solution of using claws that are biased with springs have the drawbacks of higher manufacturing costs and are more prone to defects than cup holders without the spring biased claws.

Another mechanism used is to bias the claws of a cup holder is an elastic member, such as a rubber band. However, known designs of this type also suffer from issues of complexity.

As seen above, there exists a need for a size adjustable cup holder that overcomes the drawbacks and limitations of the art, is of low complexity, has low manufacturing costs and is not prone to defects.

SUMMARY

In overcoming the drawbacks and limitations of the known art, the present invention provides a cup holder with an engagement mechanism that accommodates a wide variety of cup diameters, while avoiding the use of springs or rubber bands that may fail without warning. The cup holder so provided includes a body defining a cup receiving cavity or well. More specifically, the body includes a base from which upwardly extends a side wall. The side wall is preferably cylindrical and at its upper end thereby defines an opening for receiving a beverage container thereinto.

Mounted to the sidewall is a protrusion. The protrusion is pivotably movable about an axis perpendicular to the base, between a fully extended position and a fully retracted position. In the fully extended position, the protrusion is extended to its maximum extent into the receptacle of the cup holder. In its fully retracted position, the protrusion is withdrawn into an opening in the sidewall, such that a portion of the protrusion is flush with the sidewall. To bias the protrusion towards the fully extended position, a spring, such as a continuous elastic member, is extended around the body of the cup holder and engages pivot arms connected to the protrusions.

The protrusion further includes an inclined surface substantially oriented toward the opening. This facilitates the entrance of the beverage container to the receptacle and the pushing of the protrusions, by the cup, into a retracted position. Alternatively or additionally, the protrusions further include an inclined surface substantially oriented toward the base, thereby facilitating the exiting of the beverage container from the receptacle.

To prevent the movement of the protrusion beyond its fully extended position, the protrusion may further include a first stop. Alternatively or additionally, the protrusion may also include a second stop to prevent the rotational movement of the claw beyond the fully retracted position.

Further objects, features and advantages of this invention will become readily apparent to persons skilled in the art after review of the following description, with reference to the drawings and claims that are appended to and form a part of the specification.

DETAILED DESCRIPTION

Figure 1:
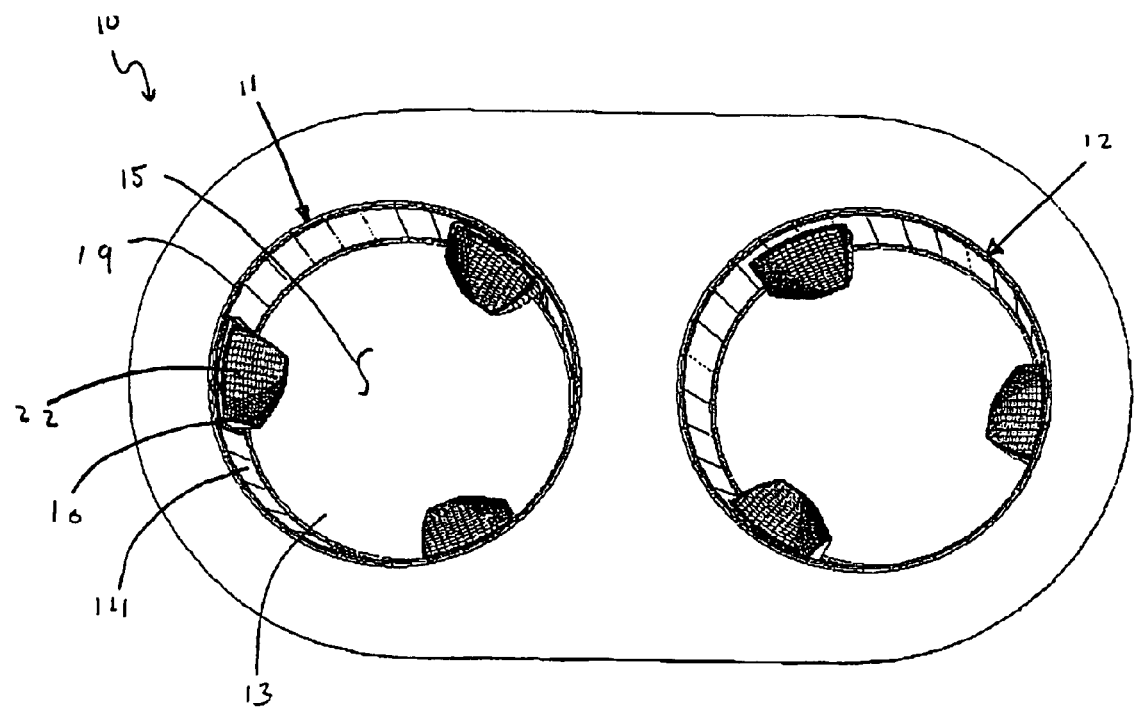
FIG. 1 shows a top view of a cup holder assembly embodying the principles of the present invention.
Figure 2:
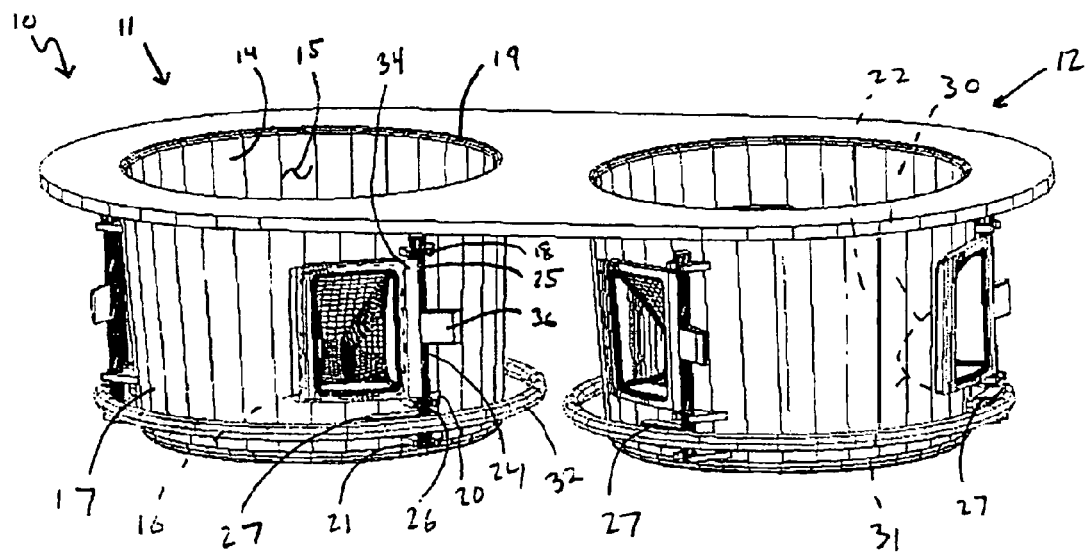
FIG. 2 shows a side view of the cup holder assembly seen in FIG. 1.

Referring now to FIGS. 1 and 2, a cup holder assembly 10 having a first cup holder 11 and a second cup holder 12 is shown. The first cup holder 11 is substantially identical in construction to the second cup holder 12 and therefore only the first cup holder 11 is described in detail herein. Although FIGS. 1 and 2 show a cup holder assembly 11 having two cup holders, the cup holder assembly 10 may have fewer or a greater number of cup holders.

As seen in FIG. 1, the first cup holder 11 includes a base 13 and a circumferential sidewall 14 that upwardly extends from the base 13 defining a substantially cylindrical receptacle 15 terminating at its upper end in a generally circular opening 19. If desired, the circumferential sidewall 14 may taper slightly as it extends downward to the base 13. Alternatively, cylindrical receptacle 15 may be any desired shape.

The sidewall 14 includes at least one, three being shown in the figures, openings 16 through which extends a claw or protrusion 22. As best shown in another embodiment of the invention in FIG. 3, the claw 22 further includes a first stop or flange 34 located about the perimeter of the base of the claw 22 and exteriorly to the sidewall 14 adjacent to the axle 24 towards the opening 16. Being greater in size than the opening 16, the first stop 34 functions to prevent the inward rotation of the claw 22 beyond a fully extended position. As such the first stop 34 will engage the exterior surface 17 of the sidewall 14 thereby preventing further rotation of the claw 22.

A second stop 36 extends from an axle 24, away from the opening 16. The second stop 36 of the claw 22 is oriented so as to engage the exterior surface 17 of the sidewall 14, thereby preventing the rotational movement of the claw 22 beyond a fully retracted position. Referring to FIGS. 1 and 2, the axle 24 is oriented in a direction generally parallel to the central axis defined by the sidewall 14. Formed on the exterior surface 17 of the sidewall 14, adjacent to one side of the opening 16, are three integrally formed retainer clips 18, 20, 21.

The retainer clips 18, 20, 21 are "C" shaped clips preferable made of plastic and unitarily formed with the sidewall 14. The opening defined by the "C" shape is outwardly oriented to receive the axle 24 into the clips 18, 20, 21, causing the clips to open slightly and close around the axle 24 when fully inserted into the clips 18, 20, 21, locking the axle 24 into the clips and allowing the axle 24 to pivot or rotate therein.

Formed on one end 26 of the axle 24 is a lever arm 27 which may be a "U" shaped channel 27, extending generally perpendicular to the axle 24 in the direction of the opening 16. The lever arm 27 is oriented such that movement of the lever arm 27 toward the exterior surface 17 of the sidewall 14 will cause the claw 22 to be moved toward its extended position. Used to bias the claw 22 to the fully extended position is an elastic member 32. The elastic member 32 extends circumferentially about the exterior surface 17 of the sidewall 14 and is received within the "U" shaped channel of the lever arm 27. The elastic member 32 provides a force against the lever arm 27, tending to bias the axle 24 to rotate in a direction extending the claw to the fully extended position.

A top claw surface 30 is generally inclined to face upwards away from the base 13. A bottom claw surface 31 has an inclined surface which faces downwards towards the base 13. The incline of the top claw surface 30 facilitates the entry of a beverage container into the receptacle, and movement at the claw 22 toward its retracted position against the bias of the elastic member, while the incline of the bottom claw surface 31 facilitates the removal of the beverage container from the receptacle.

Figure 3:
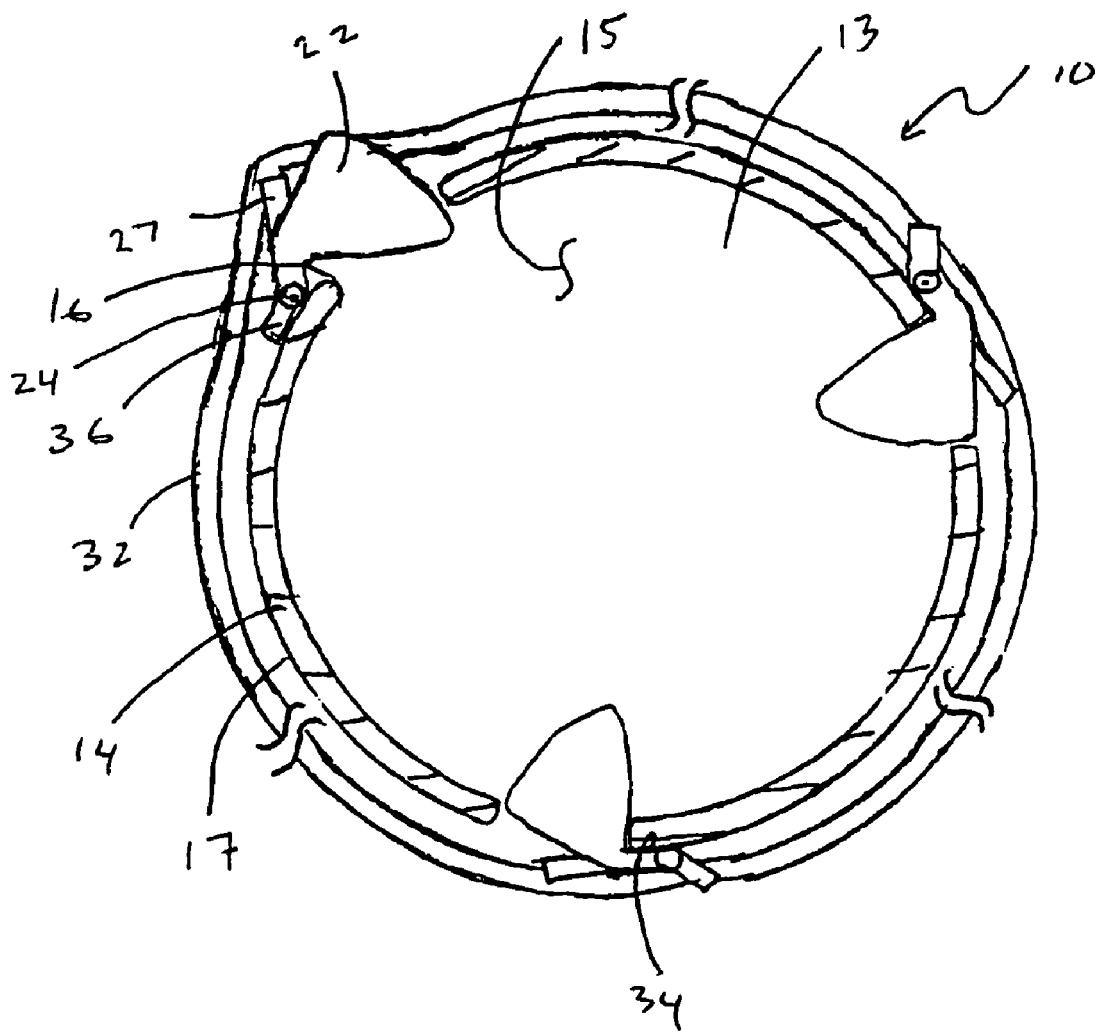
FIG. 3 shows a top view of a cup holder assembly embodying the principles of the present invention.

Referring now to FIG. 3, another embodiment of the invention is shown. A cup holder assembly 10 includes a base 13 and a circumferential sidewall 14 that upwardly extends defining a substantially cylindrical receptacle 15. Defined within the circumferential sidewall 14 is an opening 16 that extends through the circumferential sidewall 14 through which extends a claw or protrusion 22.

The claw 22 further includes a first stop 34 located about the perimeter of the base of the claw 22 and adjacent to the axle 24. Being greater in size than the opening 16, the first stop 34 functions to prevent the inward rotation of the claw 22 beyond a fully extended position. As such, the first stop 34 will engage the exterior surface 17 of the sidewall 14, thereby preventing further rotation of the claw 22.

A second stop 36 extends from an axle 24, away from the opening 16. The second stop 36 of the claw 22 is oriented so as to engage the exterior surface 17 of the sidewall 14, thereby preventing the rotational movement of the claw 22 beyond a fully retracted position.

As a person skilled in the art will readily appreciate, the above description is meant as an illustration of implementation of the principles of this invention. This description is not intended to limit the scope or application of this invention in that the invention is susceptible to modification, variation and change, without departing from spirit of this invention, as defined in the following claims.

The invention claimed is:

1. A cup holder for a motor vehicle comprising:
   a receptacle having an opening, a base and a sidewall having an exterior and an interior surface that extends from the base to the opening, an interior surface defining an aperture for receiving the container into the receptacle, the base defining a plane;
   at least one protrusion pivotably mounted to the sidewall and extending through an opening in the sidewall, wherein the protrusion being rotatable about an axis, the axis being substantially perpendicular with respect to the plane defined by the base, the protrusion being movable between a fully extended position through the opening and a fully retracted position;
   a biasing member coupled to the protrusion and biasing the protrusion toward the fully extended position;
   wherein the protrusion further includes a first stop preventing the rotational movement of the protrusion beyond the fully retracted position;
   wherein the first stop engages an exterior surface of the sidewall; and
   wherein the protrusion further comprises of a second stop thereby preventing the rotational movement of the protrusion beyond the fully extended position; and
   wherein the second stop engages an exterior surface of the sidewall.

2. The cup holder for a motor vehicle of claim 1, wherein the biasing member is a continuous elastic member extending around the sidewall.

3. The cup holder for a motor vehicle of claim 1, wherein the protrusion further comprises an inclined surface substantially facing the opening thereby facilitating entrance of the container to the receptacle.

4. The cup holder for a motor vehicle of claim 1, wherein the protrusion further comprises an inclined surface substantially facing the base thereby facilitating exit of the container from the receptacle.

5. The cup holder for a motor vehicle of claim 1, wherein the first stop is a flange extending from the protrusion and sized so as not to extend through the opening.

6. The cup holder for a motor vehicle of claim 1, wherein the second stop is a flange extending from the protrusion and sized so as not to extend through the opening.

7. The cup holder for a motor vehicle of claim 1, wherein the protrusion includes an axle located adjacent an exterior surface of the sidewall, the axle being oriented generally perpendicular with regard to the base.

8. The cup holder for a motor vehicle of claim 7, wherein the axle is rotatably retained by C-shaped clips, the C-shaped clips extending from the exterior surface of the sidewall.

9. The cup holder for a motor vehicle of claim 7, wherein the biasing member engages a lever arm extending from the axle.

10. The cup holder for a motor vehicle of claim 9, wherein the biasing member is received within a channel defined by the lever arm.

\* \* \* \* \*